United States Patent [19]
Hashimoto

[11] Patent Number: 5,482,220
[45] Date of Patent: Jan. 9, 1996

[54] DOUBLE-BEARING REEL WITH IMPROVED LEVEL WINDER ASSEMBLY

[75] Inventor: Hiroshi Hashimoto, Tokyo, Japan

[73] Assignee: Daiwa Seiko, Inc., Tokyo, Japan

[21] Appl. No.: 171,407

[22] Filed: Dec. 22, 1993

[30] Foreign Application Priority Data

Dec. 24, 1992 [JP] Japan ..................... 4-357340

[51] Int. Cl.⁶ ..................................... A01K 89/015
[52] U.S. Cl. ........................................ 242/279; 242/310
[58] Field of Search ..................... 242/279, 280, 242/281, 310, 312, 314, 315

[56] References Cited

U.S. PATENT DOCUMENTS

| | | | |
|---|---|---|---|
| 1,608,490 | 11/1926 | Catucci | 242/279 X |
| 1,691,622 | 11/1928 | Adams et al. | 242/279 |
| 1,899,908 | 2/1933 | Adams | 242/279 |
| 1,941,227 | 12/1933 | Russell et al. | 242/279 |
| 2,149,413 | 3/1939 | Balz et al. | 242/279 |
| 2,184,242 | 12/1939 | Pflueger | 242/279 |
| 5,308,019 | 5/1994 | Karlsson | 242/279 |

FOREIGN PATENT DOCUMENTS 1-44062  12/1989  Japan .

*Primary Examiner*—Joseph J. Hail, III
*Attorney, Agent, or Firm*—Longacre & White

[57] ABSTRACT

A double-bearing reel which is readily disassembled and reassembled. The double-bearing reel is provided with a spool rotatably supported between side plates, the spool being rotatably geared to take-up driving mechanisms. A level winder unit is provided for guiding and winding a fishing line onto the spool in parallel. The level winder unit includes a worm shaft rotatably geared to the take-up driving mechanisms of the spool, a guide tube embracing the worm shaft and having a slit, and a fishing line guide reciprocating along the slit of the guide tube as the worm shaft rotates. A removal preventive member is provided for preventing the level winder unit from slipping off in cooperation with the side plates when the level winder unit is detachably installed in the mating openings formed in the respective side plates.

7 Claims, 6 Drawing Sheets

DOUBLE-BEARING REEL WITH IMPROVED LEVEL WINDER ASSEMBLY

BACKGROUND OF THE INVENTION

The present invention relates to a double-bearing reel in which a level winder is made in a unit construction. There is known a double-bearing reel having a level winder for uniformly winding a fishing line onto a spool in parallel, as disclosed, for instance, by Japanese Utility Model Laid-Open Publication No. Hei. 1-44062.

The level winder disclosed in the above-noted Publication includes a worm shaft which is coupled to a take-up driving mechanism to rotate in conjunction therewith, a guide tube having a slit, and a fishing line guide that reciprocates along the slit of the guide tube as the worm shaft rotates and has a mating opening through which the guide is fitted around the guide tube. The level winder unit is installed between side plates.

However, such level winder requires troublesome manners when being incorporated or assembled into the reel body. That is to say, first laterally inserting the guide tube through openings formed in the respective side plates and simultaneously through the fishing line guide while holding the fishing line guide between the side plates to install the guide tube, then inserting the worm shaft into the guide tube and retaining it in place with a removal preventive means, and thereafter fitting a pin for mating the fishing line guide with the guide slot of the worm shaft. Consequently, a fishing reel having such level winder requires troublesome and time-consumptive manners when being assembled in a production line and disassembled-reassembled for maintenance.

SUMMARY OF THE INVENTION

It is therefore an objective of the present invention to provide a double-bearing type reel which can readily be disassembled and reassembled.

In order to attain the above-noted and other objectives, a double-bearing reel which includes: a spool supported between side plates and driven to rotate through a take-up driving mechanism; a level winder for guiding and uniformly winding a fishing line onto said spool in parallel, wherein said level winder includes a worm shaft adapted to be rotatably geared to said take-up driving mechanism, a guide tube embracing said worm shaft and having a slit, and a fishing line guide which reciprocates along said slit of said guide tube as said worm shaft rotates and is removable from said reel as a unit construction; and a removal preventive member for detachably retaining said level winder into mating openings respectively formed in said side plates.

On condition that the level winder unit provided with the worm shaft and the guide tube is formed into a unit, the level winder unit can readily be incorporated with and secured to the double-bearing reel by the removal preventive member for preventing it from slipping off in association with the side plates by installing it in the mating openings formed in the respective side plates.

The present invention further provides a structure for detachably retaining a level winder unit in between side plates of a fishing reel, said side plates defining a first direction substantially parallel to surfaces of said side plates, said structure comprising: a notched hole portion formed in each of said side plates, and having an open part and a bottom part, said open part being located at a periphery of each of said side plates and permitting said level winder unit to be inserted into said notched hole toward said bottom part in said first direction; a removal preventive member located on said open part for depressing said level winder unit against said bottom part and preventing said level winder unit from being displaced in said first direction; and first means for retaining said removal preventive member in said open part. This structure enables the level winder unit as a whole to be assembled into or disassembled from the fishing reel.

DETAILED DESCRIPTION OF THE PREFERRED EMBODIMENTS

Preferred embodiments of the present invention will now be described in detail with reference to the accompanying drawings attached hereto.

Figure 1:
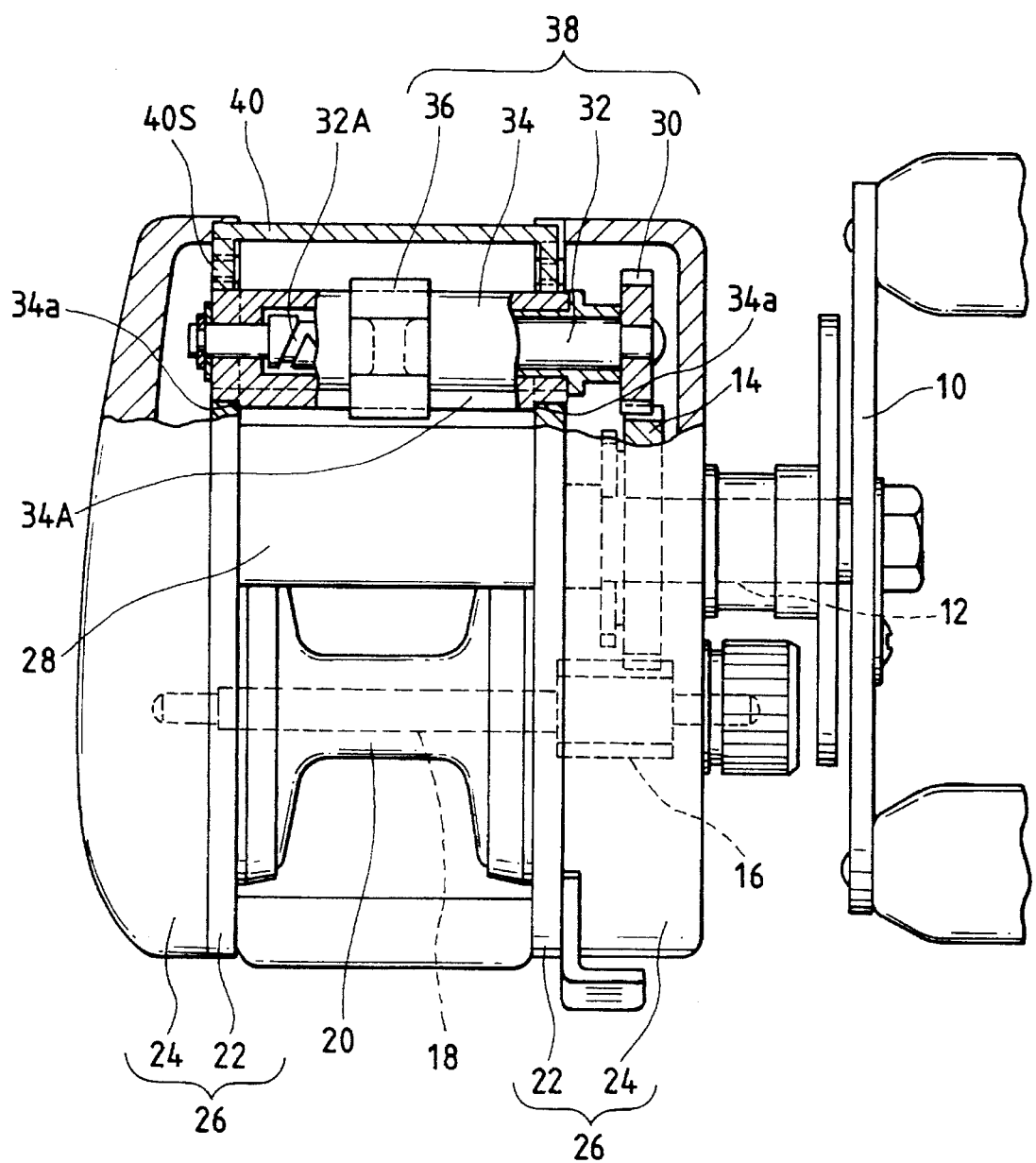
FIG. 1 is a top view of a double-bearing reel embodying the present invention.
Figure 2:
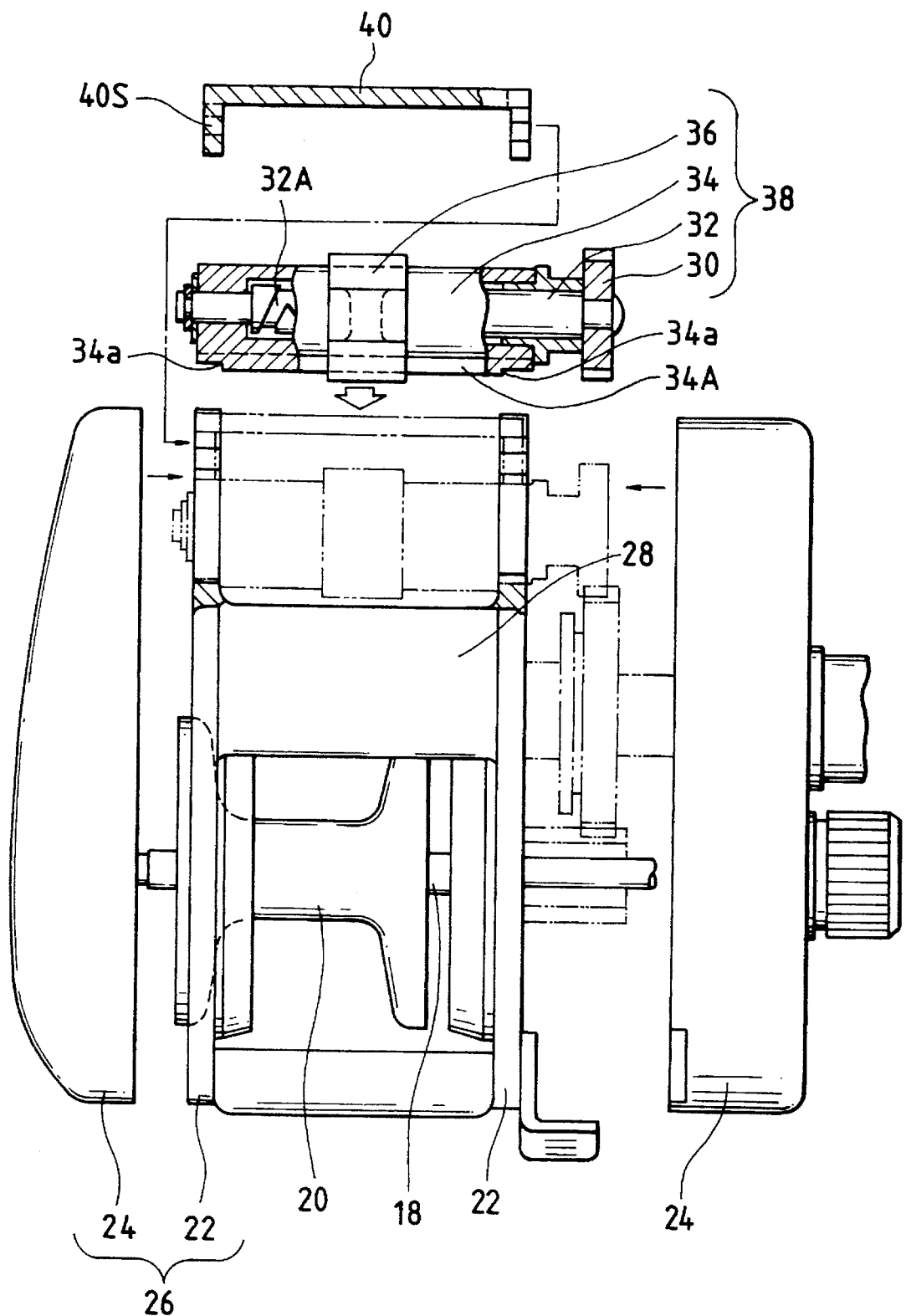
FIG. 2 is an exploded view of the reel of FIG. 1.
Figure 3:
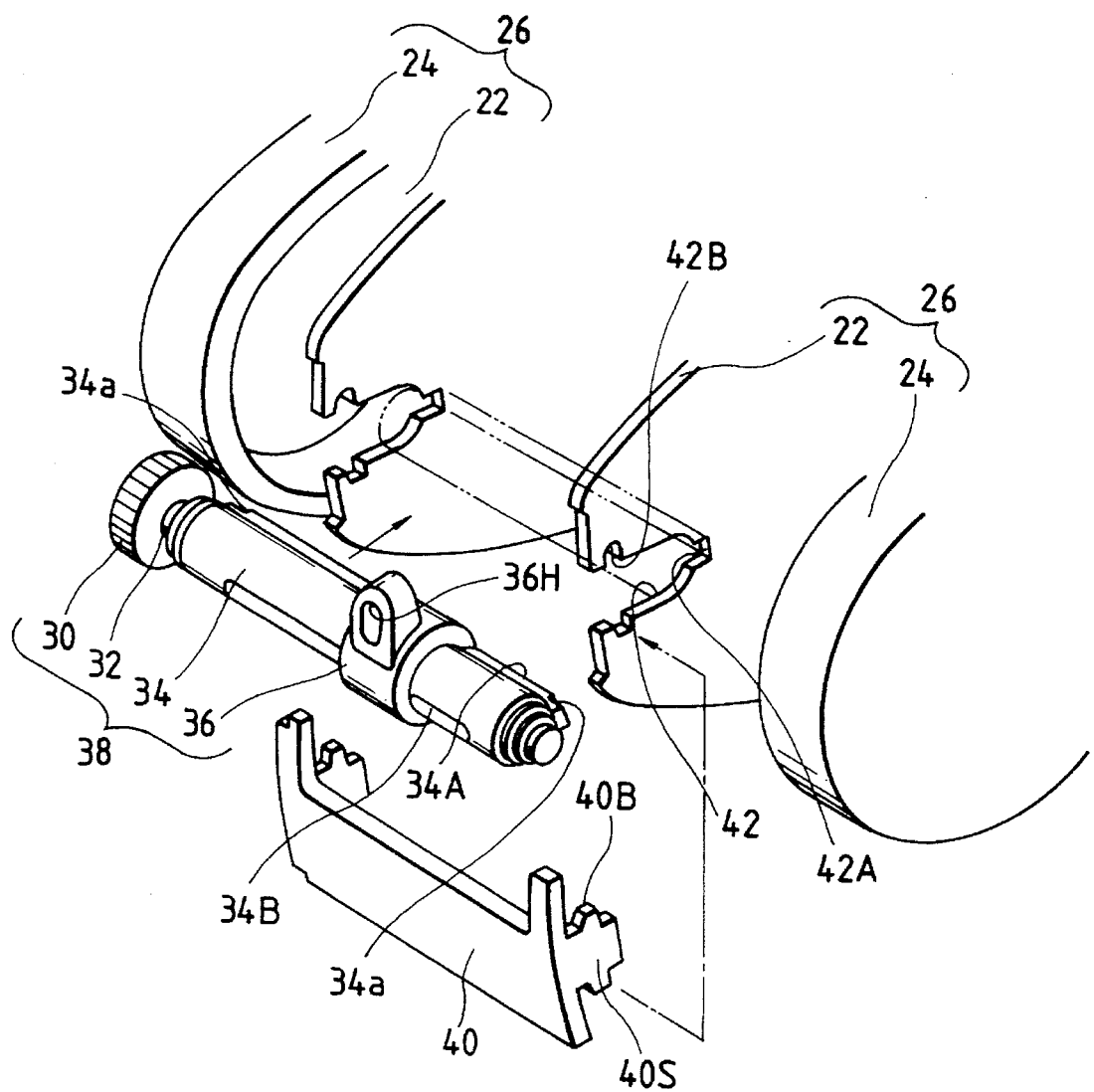
FIG. 3 is a partial exploded perspective view of the reel of FIG. 1.

FIGS. 1 to 3 illustrate a first embodiment of the present invention. Combinations of internal and external side plates 22, 24 are fitted to both sides of a strut 28, respectively. Each combination of the internal and external side plates 22, 24 is called a side plate 26. A handle 10 is arranged outside the one side plate 26 and a handle shaft 12 on which the handle 10 is fixed passes through the side plate 26 and is rotatably supported thereby.

A driving gear 14 is fitted to the handle shaft 12 and a pinion gear 16 meshing with the driving gear 14 is fitted to a spool shaft 18 positioned in parallel to the handle shaft 12. Moreover, a spool 20 for winding a fishing line is fitted to the spool shaft 18. Consequently, the spool 20 is made rotatable by the handle 10 via the take-up driving mechanisms 14, 16.

On the other hand, a level winder unit 38 having a worm shaft 32 is arranged in parallel to the spool shaft 18. In other words, the worm shaft 32 with a worm gear 30 fitted to its one end is embraced by a guide tube 34. Further, the guide tube 34 is embraced by a fishing line guide 36 having a fishing line guide hole 36H (FIG. 3). The guide tube 34 is provided with a slit 34B as shown in FIG. 3 and the fishing line guide 36 mates via a mating pin (not shown but similar to a mating pin 36A of FIG. 5) as a part of the fishing line guide 36 with a guide slot 32A formed in the surface of the worm shaft 32 through the slit 34B, so that the fishing line guide 36 is allowed to reciprocate with respect to the guide tube 34.

The level winder unit 38 incorporating the worm shaft 32, the guide tube 34 and the fishing line guide 36 is forced into mating openings 42 which is formed in the internal side plates 22 and open toward the forepart of the reel. The level winder unit 38 thus forced into the mating openings 42 is depressingly retained in place by means of a removal preventive member 40 which is located outside the level winder 38, so as to be prevented from slipping off toward the forepart of the reel. Finally, the external side plates 24 are added so as to prevent the removal preventive member 40 from coming out of either horizontal side of the reel and to cover the driving mechanisms.

More specifically, mating parts 42A are formed in the rearmost portions of the respective mating openings 42 of the internal plates 22 to catch a protruded rotation stopper 34A of the guide tube 34 of the level winder unit 38, whereby the guide tube 34 is kept unrotatable. On both sides of the protruded stopper 34A exist notches 34a and as the notches 34a are forced in to abut against the respective internal side plates, the level winder unit 38 is prevented from laterally slipping off the internal side plates.

In order to integrally install the removal preventive member 40, pressers 40S are laterally slid with respect to the internal side plate 22 while being pressed against the guide tube 34 of the level winder unit 38, so that the protrusions 40B of the pressers 40S mate with the respective mating parts 42B formed in the foreparts of the mating openings 42. As a result, the level winder unit 38 together with the removal preventive member 40 is prevented from slipping off from the internal side plates 22 toward the forepart of the reel. Moreover, both sides of the removal preventive member 40 are covered with the respective external side plates 24 so that the removal preventive member 40 is prevented from laterally slipping off, the removal preventive member 40 being thus held therebetween.

When the level winder unit 38 is thus integrally installed, the worm gear 30 fitted to one end of the worm shaft 32 meshes with the driving gear 14 combined with the handle shaft 12 as shown in FIG. 1 and the spool 20 as well as the worm shaft 32 are caused to rotate as the handle 10 is turned. Therefore, the fishing line guide 36 mated with the guide slot 32A formed in the worm shaft 32 laterally reciprocates along the slit 34B of the guide tube 34.

The level winder unit 38 complete in itself makes it simpler for such a unit to be not only incorporated with the reel but also overhauled for maintenance. In other words, the work of disassembling-reassembling the reel is greatly facilitated.

Figure 4:
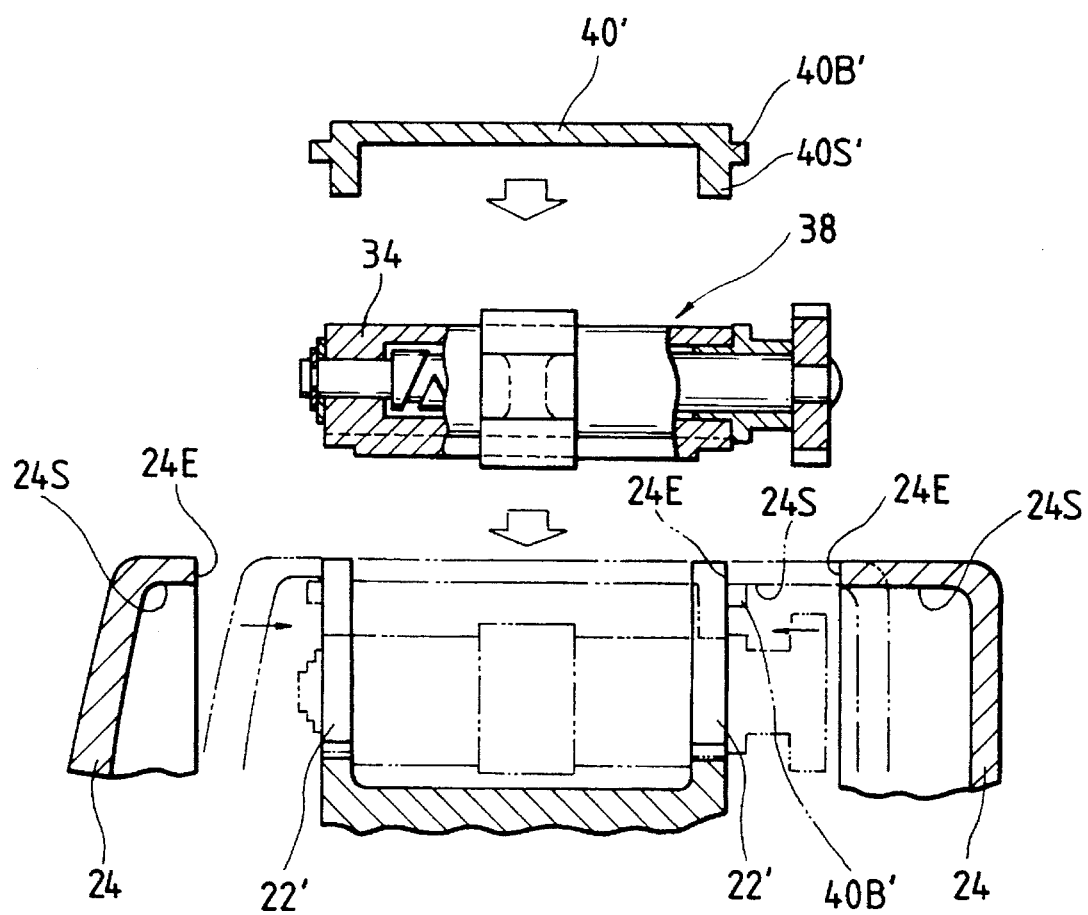
FIG. 4 is a partial exploded sectional view of another reel as a second embodiment of the present invention.

FIG. 4 illustrates a modified example of the protrusions 40B formed in the pressers 40S of the removal preventive member 40 according to the first embodiment above, wherein there are shown protrusions 40B' protruded from respective pressers 40S' on both sides of a removal preventive member 40'. A removal preventive member 40' is simply pressed against the guide tube 34 of the level winder unit 38 from the forepart of the reel after the level winder unit 38 is incorporated with internal side plates 22' so as to prevent the level winder unit 38 from slipping off. As shown by a two-dot chain line, the removal preventive member 40' is covered with the external side plates 24 so as to be prevented from slipping off toward the forepart and the lateral sides of the reel by the inner faces 24S and edge faces 24E of the respective external side plates 24.

Figure 5:
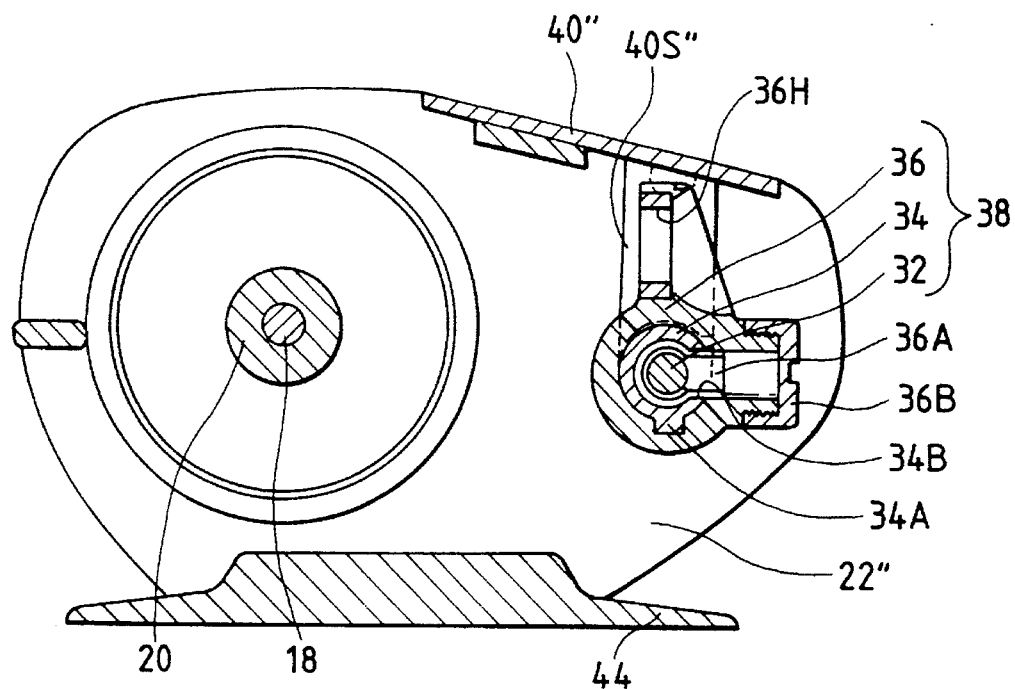
FIG. 5 is a side sectional view of still another reel as a third embodiment of the present invention.
Figure 7:
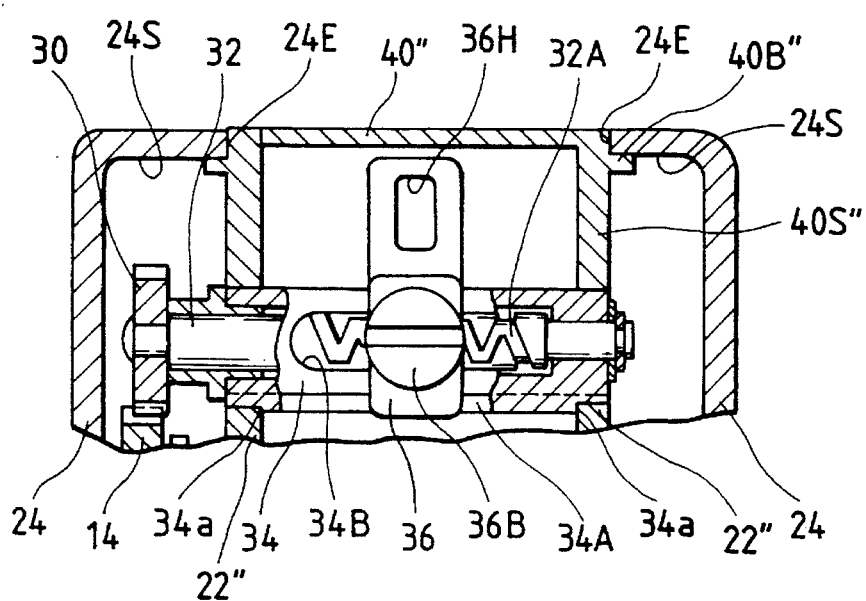
FIG. 7 is a partial exploded elevational view of the reel of FIG. 5 as viewed from the forepart thereof.
Figure 6:
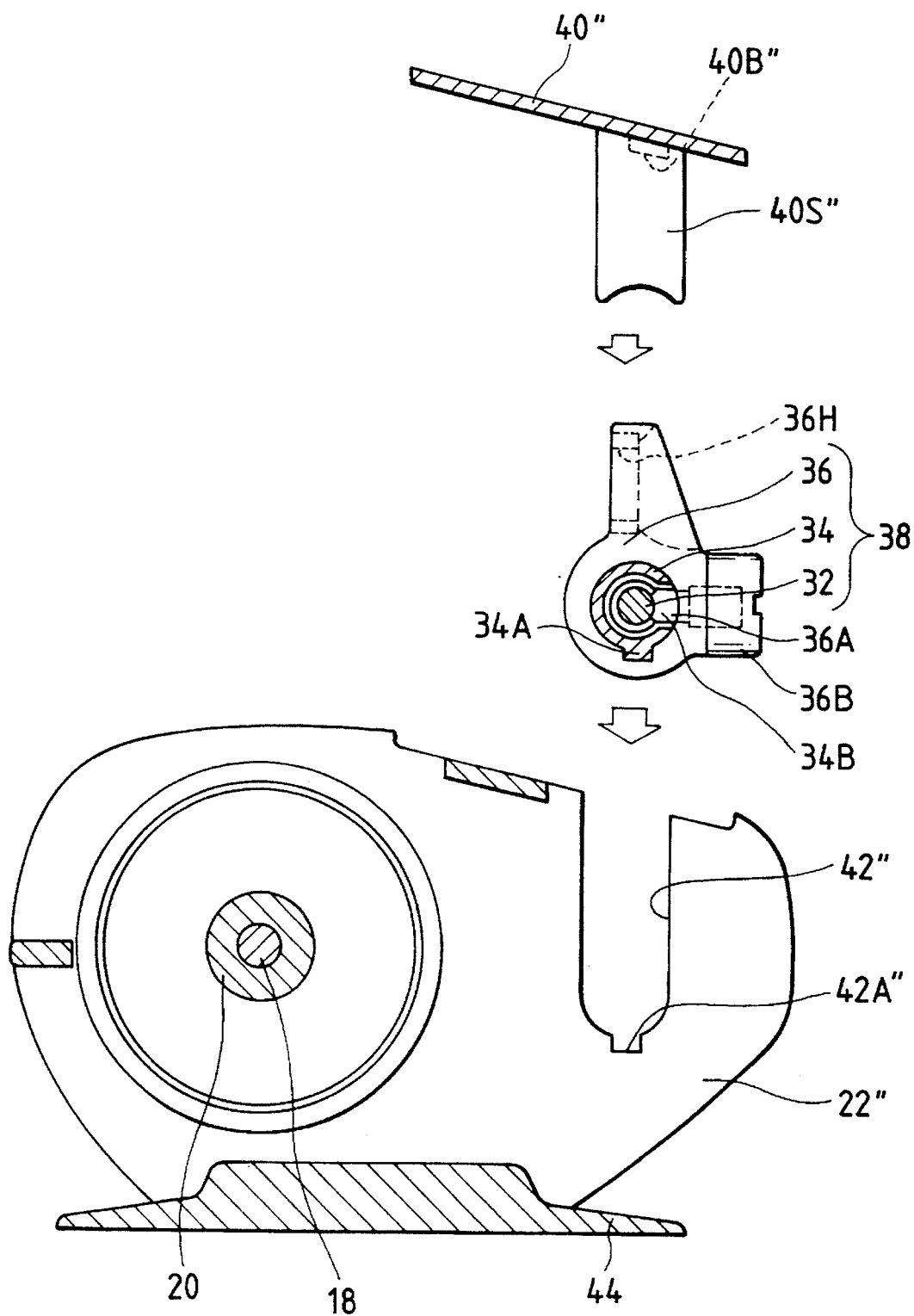
FIG. 6 is an exploded view of the reel of FIG. 5.

FIGS. 5 to 7 illustrate a third embodiment of the present invention. What makes this embodiment different from the first and second ones is that the level winder unit 38 can be installed from the upper side of the reel. More specifically, each internal side plate 22" is provided with a mating opening 42" which is upwardly open and formed with a mating part 42A" at its lowermost end. The level winder unit 38 is fitted in the mating openings 42" from above. The protruded rotation stopper 34A of the guide tube 34 of the level winder unit 38 is mated with the above mating parts 42A" and moreover notches 34a on both sides of the protruded rotation stopper 34A abut against the respective internal side plates 42" as in the case of the first embodiment.

As the level winder unit 38 according to the third embodiment includes those which have not been disclosed according to the first and second embodiments, the description of them will subsequently be given. A mating pin 36A is mated with the worm shaft 32 via the slit 34B provided in the guide tube 34 embracing the worm shaft 32 and is retained by a nut member 36B to the guide body 36.

A removal preventive member 40", to be simultaneously used as a palming plate, having pressers 40S" and protrusions 40B" on respective sides of the pressers 40S" is pressed against the guide tube 34 of the level winder unit 38, and thereafter the respective external side plates 24 are attached in place. The external side plates 24 together with their respective edge faces 24E hold the pressers 40S" of the removal preventive member 40" and prevent it from laterally slipping off, whereas they press the protrusions 40B" by means of their respective inner faces 24S to prevent the removal preventive member 40" from upwardly slipping off. This third embodiment is a modified example of the second one rather than that of the first one. Needless to say, it is possible that mating parts (equivalent to those 42B according to the first embodiment) are formed in the respective internal side plates 22" to prevent the removal preventive member 40" from slipping off externally, as in the first embodiment.

As is obvious from the description given above, the level winder unit which is complete in itself makes it simpler and efficient to disassemble and reassemble a reel since the level winder unit has been incorporated with and totally held in the reel by means of the removal preventive member which operates in conjunction with its side plates. In addition, the removal preventive member of the present invention may be retained or secured in place directly by mounting screws.

What is claimed is:

1. A double-bearing reel comprising:

a spool supported between side plates and driven to rotate through a take-up driving mechanism;

a level winder for guiding and uniformly winding a fishing line onto said spool in parallel, wherein said level winder includes a worm shaft adapted to be rotatably geared to said take-up driving mechanism, a guide tube embracing said worm shaft and having a slit, and a fishing line guide which reciprocates along said slit of said guide tube as said worm shaft rotates and said level winder is removable from said reel as a unit construction;

a notched hole portion defined by a peripheral edge of each of said side plates, said notched hole portion comprising a recess for receiving said level winder and at least one notch extending in a direction transverse to said recess; and a removal preventive member for detachably retaining said level winder into said recess in said notched hole portion, wherein said removal preventive member comprises a mating projection means for matingly engaging said at least one notch and is at least partially fitted into said notched hole portion, said removal preventive member preventing said removal preventive member from being removed from said recess.

2. The reel according to claim 1, wherein each of said mating openings has substantially a U-shape opened at a periphery of said side plate.

3. The reel according to claim 1, wherein said removal preventive member is retained in place by said side plates.

4. A structure for detachably retaining a level winder unit in between side plates of a fishing reel, said side plates defining a first direction substantially parallel to surfaces of said side plates, said structure comprising:

- a notched hole portion formed in each of said side plates having an open part and a bottom part, said open part being located at a periphery of each of said side plates, wherein said level winder is inserted into said notched hole through said open part and toward said bottom part in said first direction;
- a removal preventive member at least partially fitted into said notched hole portion for locking said level winder unit in contact with said bottom part and preventing said level winder unit from being displaced in said first direction;
- a cover attached to each of said side plates retaining said removal preventive member in said notched hole portion; and
- wherein said bottom part of each of said notched hole portion has a shape defined by a peripheral edge of said side plates, said edge comprising at least one notch extending transverse to said first direction formed to receive a projection provided on said removal preventive member, said notch preventing said removal preventive member from being displaced in a second direction opposite to said first direction.

5. The structure according to claim 4, further comprising:

means for preventing said level winder unit from being displaced in a direction substantially transverse to said first direction when said level winder unit is depressed against said bottom part.

6. The structure according to claim 4, wherein said level winder unit includes a worm shaft adapted to be coupled to a take-up driving mechanism provided in said fishing reel when said level winder unit is depressed against said bottom part, a guide tube embracing said worm shaft and having a slit extending in an axial direction thereof, and a fishing line guide which reciprocates along said slit as said worm shaft rotates.

7. The structure according to claim 6, further comprising:

means for preventing relative rotation between said guide tube and each of said side plates when said level winder unit is depressed against said bottom part.

* * * * *